United States Patent
Solan et al.

(10) Patent No.: US 10,411,318 B2
(45) Date of Patent: Sep. 10, 2019

(54) METAL-OXYGEN BATTERY

(71) Applicant: COMMISSARIAT A L'ENERGIE ATOMIQUE ET AUX ENERGIES ALTERNATIVES, Paris (FR)

(72) Inventors: Sebastien Solan, Seyssinet-Pariset (FR); Lionel Picard, Seyssinet-Pariset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/761,285

(22) PCT Filed: Sep. 19, 2016

(86) PCT No.: PCT/EP2016/072110
§ 371 (c)(1),
(2) Date: Mar. 19, 2018

(87) PCT Pub. No.: WO2017/050672
PCT Pub. Date: Mar. 30, 2017

(65) Prior Publication Data
US 2018/0269549 A1 Sep. 20, 2018

(30) Foreign Application Priority Data
Sep. 21, 2015 (FR) .................... 15 58852

(51) Int. Cl.
*H01M 12/08* (2006.01)
*H01M 10/052* (2010.01)
*H01M 10/0569* (2010.01)
*H01M 4/02* (2006.01)
*H01M 10/0568* (2010.01)

(52) U.S. Cl.
CPC ............ *H01M 12/08* (2013.01); *H01M 4/02* (2013.01); *H01M 10/052* (2013.01); *H01M 10/0569* (2013.01); *H01M 10/0568* (2013.01); *H01M 2300/004* (2013.01); *H01M 2300/0034* (2013.01); *Y02E 60/128* (2013.01)

(58) Field of Classification Search
None
See application file for complete search history.

(56) References Cited

U.S. PATENT DOCUMENTS

| | | |
|---|---|---|
| 2010/0266907 A1 | 10/2010 | Yazami |
| 2012/0058402 A1 | 3/2012 | Nakanishi et al. |
| 2014/0045078 A1 | 2/2014 | Eicher et al. |
| 2015/0364801 A1 | 12/2015 | Wijaya et al. |

FOREIGN PATENT DOCUMENTS

| | | |
|---|---|---|
| JP | 2015-109243 A | 6/2015 |
| WO | WO 2012/146525 A1 | 11/2012 |
| WO | WO 2014/13346 A1 | 9/2014 |

OTHER PUBLICATIONS

International Search Report dated Oct. 18, 2016, in PCT/EP2016/072110 filed Sep. 19, 2016.
French Search Report dated May 18, 2016, in French Application 1558852 filed Sep. 21, 2015.

*Primary Examiner* — Sarah A. Slifka
(74) *Attorney, Agent, or Firm* — Oblon, McClelland, Maier & Neustadt, L.L.P.

(57) ABSTRACT

The present invention concerns a metal-oxygen battery containing, as the electrolyte, a monophasic electrolytic solvent medium having at least an alkali metal or alkaline earth metal supporting salt, preferably a lithium salt; a fluorocarbon solvent having an oxygen solubility at least equal to 30% v/v; 10 to 60% by volume of at least fluorinated solubilizing agent; and a carbonate solvent. The fluorinated solubilizing agent is different from the fluorocarbon solvent; is chosen from the mono-, poly- and perfluorinated, saturated, unsaturated and/or aromatic, linear, branched and/or cyclic hydrocarbon compounds; and has 4 to 18 carbon atoms with the carbon chain having at least one polar end unit and can be interrupted by one or more heteroatoms of oxygen and sulfur atoms and radicals —N(R1)-, —B(R1)- and —P(R1R2)- in which R1 and R2, identical or different, represent a hydrogen atom or a C1 to C4 alkyl radical.

16 Claims, 1 Drawing Sheet

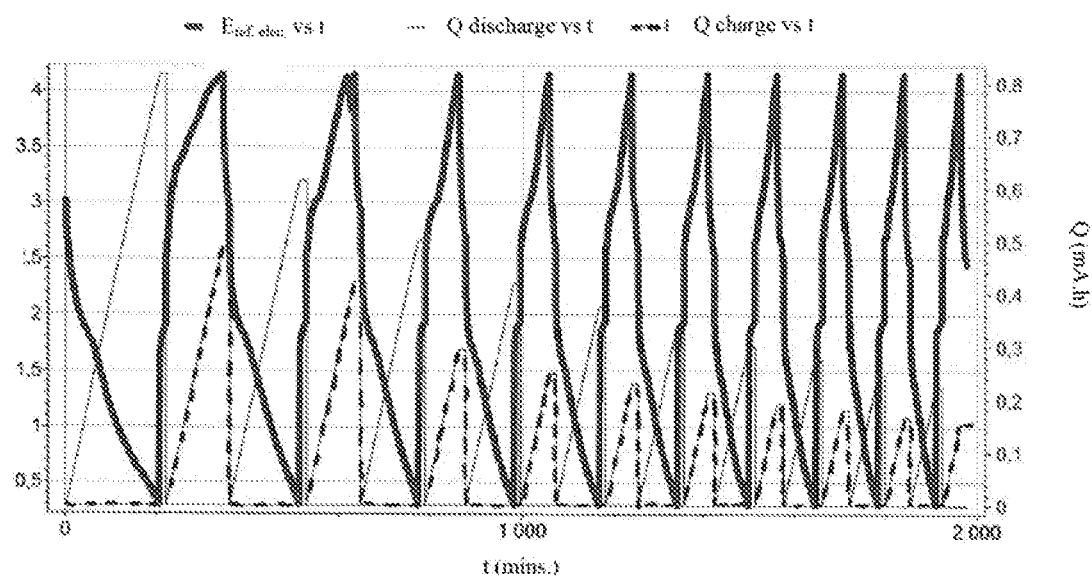

METAL-OXYGEN BATTERY

The present invention relates to the field of metal oxygen batteries, and is intended more particularly to propose a novel battery of this type.

Metal-oxygen batteries, also called metal-air batteries, are a category of electrochemical cells in which oxygen originating from the ambient environment is reduced on the surface of the cathode. The reduction of the oxygen forms an oxide or peroxide ion which reacts with a cationic metal species.

Metal-oxygen batteries have thus been developed using Fe, Zn, Al, Mg, Ca and Li.

Oxygen is therefore the active material of the positive electrode. It is a powerful and lightweight oxidant that is universally available "at no cost". Additionally, depending on the design of the system, it is possible not to store it initially in the battery, i.e. to draw it directly from the atmosphere by using an air cathode. Consequently, these systems theoretically have a high mass energy density.

In order to maintain these advantages associated with the use of oxygen, the material of the negative electrode of a metal-air battery must have a number of characteristics. Its molar mass must be low and the charge carried by its oxidized species (cations) must be high to provide maximum capacity density (per unit of weight or volume). It must be a strong reducing agent to supply a high voltage at the terminals of the battery and thus provide high energy density. Finally, it must be cheap and abundant, for evident economic reasons. The elements meeting these requirements are, notably, salts of lithium, aluminum, magnesium, calcium, iron and zinc, although lithium appears to be the best choice for developing electrochemical systems with high mass energy density.

For evident reasons, the optimization of the performance of metal-oxygen batteries, particularly $Li/O_2$, is a constant aim.

One strategy for improvement appears to be, notably, to increase the solubility of oxygen significantly in the electrolytes of these batteries.

For evident reasons, the electrolyte is one of the essential components of a battery. It contributes to the circulation of the electroactive components of the battery system. The supporting salt dissolved in the solvent must provide the best possible ionic conductivity. As for the associated solvent medium, this must meet a number of requirements. In particular, the electrolyte must have low viscosity, remain liquid over a wide temperature range, have a high dielectric constant so as to promote the dissociation of the lithium salt, be electrochemically stable over a wide field of electroactivity, and, evidently, be capable of solubilizing a large amount of oxygen.

As a general rule, no solvent can provide all these properties on its own, and it is often necessary to mix a number of solvents in order to meet all of these expectations.

Among the electrolyte solvents usually adopted for this use, we may mention, in particular, aprotic polar solvents such as carbonate solvents, such as ethylene carbonate, propylene carbonate, dimethyl carbonate, dipropyl carbonate and ethyl methyl carbonate.

Recently, the document US 2010 0266907 has reported the capacity of perfluorocarbonate solvents to dissolve oxygen and therefore their usefulness as cathode electrolytes of metal/ion batteries for increasing the cathode potential.

Unfortunately, this type of solvent has not proved to be compatible with the simultaneous dissolution of lithium salts. This is particularly true in the ease of $Li_2CoPO_4F$, $LiNiO_6Mn_{1.4}O_4$ or $LiCoPO_4$ salts, which are particularly useful because, notably, they provide access to higher potentials, that is to say of the order of 4.3 to 4.4 V, without requiring the use of additives; and in the case of salts of the lithium graphite type and particularly silicon salts, which, for their part, are found to be compatible with use at low potential, that is to say below 0.001 V.

Consequently there is still a need for electrolyte media for metal-oxygen batteries which can provide high solubility of oxygen, on the one hand, and of the associated supporting salts, particularly lithium salts, on the other hand.

The present invention has the specific aim of proposing a novel family of metal-oxygen batteries characterized, notably, in that it has a liquid electrolyte medium that meets the aforementioned expectations.

Thus the electrolyte considered according to the invention is advantageously usable at potentials ranging from 0.01 to 4.4 V.

The electrolyte considered according to the invention is capable of solubilizing essentially all of the supporting salts currently used in metal-oxygen batteries.

Finally, it has high solubility in respect of oxygen.

Thus the present invention proposes a metal-oxygen battery comprising, by way of electrolyte, a single phase electrolyte medium comprising at least:

a supporting salt of alkali or alkaline earth metal, preferably a lithium salt, a fluorocarbon solvent having a solubility for oxygen of at least 30% v/v, from 10% to 60% by volume of at least one fluorinated solubilizing agent, distinct from said fluorocarbon solvent, chosen from among mono-, poly- and perfluorinated, saturated, unsaturated and/or aromatic, linear, branched and/or cyclic hydrocarbon compounds, having 4 to 18 carbon atoms, in which the carbon chain carries at least one polar terminal pattern and may be interrupted by one or more heteroatoms chosen from among oxygen and sulfur atoms, and the radicals —N($R^1$)—, —B($R^1$)— and —P($R^1R^2$)—, where $R^1$ and $R^2$, identical or different, represent a hydrogen atom or an alkyl radical in $C_1$ to $C_4$, and a carbonate solvent.

For the purposes of the invention, a fluorocarbon solvent means a compound which is fluid at ambient temperature and atmospheric pressure, and whose carbon skeleton comprises at least one, or preferably more, fluorine atoms, or is advantageously perfluorinated.

For the purposes of the invention, a polar terminal pattern means a functional group at a free end on the carbon skeleton of the solubilizing agent, that is to say at the terminal end of the main carbon chain or at the end of a carbon radical forming a branch of this chain, if present, this pattern being such as to give the solubilizing agent an affinity for the associated supporting salt of alkali or alkaline earth metal, which is polar by nature.

Advantageously, the electrolyte medium considered according to the invention is non-aqueous.

Surprisingly, the inventors have discovered that the association of a fluorocarbon solvent with a solubilizing agent according to the invention provides access to an electrolyte medium that has a satisfactory solubility with respect to oxygen and its associated supporting salt or salts, and advantageously has a significantly increased electrochemical stability.

The wide window of electrochemical stability is particularly useful in terms of improved performance.

As regards the capacity of this medium to dissolve the supporting salt or salts, this is necessary for the correct operation of the corresponding battery.

This capacity is notably reflected by the fact that the liquid electrolyte medium is a single phase medium.

For the purposes of the invention, a single phase medium is a medium in which no more than one phase can be discerned by microscopic examination.

In other words, the supporting salt is present in the solute state in the electrolyte medium of the invention. In this respect, the electrolyte medium according to the invention is different from a dispersion. Here, the supporting salt is not present, wholly or partially, in the particle state.

This solubility may have required the heating of the electrolyte medium of the invention to produce it. However, this solute state achieved by heating persists when the electrolyte medium is cooled to ambient temperature.

For the purposes of the invention, an ambient temperature is a temperature of 20° C.+/−2° C.

Similarly, the solubilizing agent, the fluorocarbon solvent and the carbonate solvent according to the invention show an affinity for one another in the presence of the supporting salt. Advantageously, the electrolyte medium according to the invention is not subject to any demixing phenomenon that might separate the fluorinated solvent from the solubilizing agent and/or the carbonate solvent.

As mentioned above, the fluorinated solvent or solvents considered according to the invention have a solubility of at least 30% v/v in respect of oxygen.

This solubility is assessed at ambient temperature and atmospheric pressure. It may, notably, be assessed by the Winkler method of saturating a liquid medium with oxygen and evaluating the difference in volume of the liquid medium.

Other characteristics and variants of the invention will be more apparent from a perusal of the following description, examples and drawings, which are provided for illustrative purposes and do not limit the invention.

In the remainder of the text, the expressions "between . . . and . . . ", "in the range from . . . to . . . ", and "varying from . . . to . . . " are equivalent, and signify that the boundaries are included unless stated otherwise.

Unless specified otherwise, the expression "including/comprising a" is to be interpreted as "including/comprising at least one".

Fluorocarbon Solvent

For the purposes of the invention, a fluorocarbon solvent may comprise atoms of hydrogen, oxygen, sulfur, nitrogen or phosphorus.

According to a particular variant, it is stripped of an oxygen, sulfur, nitrogen or phosphorus atom.

In particular, the fluorocarbon solvent suitable for the invention comprises a hydrocarbon skeleton substituted by one, or preferably more, fluorine atoms, and, if necessary, substituted by a hydroxyl function.

It is advantageously perfluorinated; that is to say, it is composed solely of carbon and fluorine atoms.

It is preferably chosen from among perfluorocarbonate, saturated, unsaturated, and/or aromatic, linear, branched and/or cyclic compounds, having 4 to 18 carbon atoms.

Advantageously, it is stripped of an aromatic pattern.

According to an advantageous variant, this fluorocarbon solvent is acyclic or mono- or polycyclic and contains at least 6 carbon atoms.

By way of illustration, fluorocarbonate compounds suitable for the invention that may, notably, be mentioned are decafluoropentane, tridecafluorohexane, pentafluorobutane, nonafluorohexane, heptafluorocyclopentane, tetradecafluorohexane, hexadecafluoroheptane, perfluorooctane, 1H-perfluorooctane, perfluorononane, perfluorodecalin and perfluorooctanol solvents More preferably, it is derived from decalin.

More particularly, it is perfluorodecalin.

Advantageously, the fluorocarbon solvent or mixture of fluorocarbon solvents forms 20% to 90%, or preferably 60% to 90%, of the total volume of the electrolyte medium of the battery according to the invention.

Solubilizing Agent

The solubilizing agent required according to the invention is the decisive factor in providing access to a single phase electrolyte medium based on a mixture containing at least one fluorocarbon liquid solvent and at least one supporting salt, which are naturally stripped of any affinity for one another.

The solubilizing agent according to the invention may be used, notably, to solubilize the supporting salt and ensure that it has a solute state even in a mixture with the fluorocarbon and carbonate solvent or solvents which are also required according to the invention.

Moreover it must not affect the electrochemical stability or the solubilizing capacity in respect of oxygen of this fluorocarbon solvent medium, the profitable use of which is the specific aim of the invention.

The solubilizing agent is a fluorinated compound, distinct from the jointly considered fluorocarbon solvent, and having characteristics that may be described as amphiphilic, like those, notably, of surfactants, but having a higher polarity than the fluorocarbon solvent.

It is a mono-, poly- or perfluorinated, saturated, unsaturated and/or aromatic, linear, branched and/or cyclic hydrocarbon compound, having 4 to 18 carbon atoms, in which the carbon chain carries at least one polar terminal pattern and may, if necessary, be interrupted by one or more heteroatoms, notably chosen from among oxygen and sulfur atoms, and the radicals —N(R$^1$)—, —B(R$^1$)— and —P(R$^1$R$^2$)—, where R$^1$ and R$^2$, identical or different, represent a hydrogen atom or an alkyl radical C$_1$ to C$_4$.

Advantageously, the solubilizing agent conforms to the general formula (I):

$$Z—[(C_cF_{2c})—(X)_n]_q—(C_eH_{2e})_p—Y \quad (I)$$

in which:

$C_cF_{2c}$ represents a saturated, linear or branched perfluorocarbonate radical, where c represents an integer in the range from 4 to 18, X is chosen from among, oxygen and sulfur atoms and the radicals —N(R$^2$)—, —B(R$^2$)— and —P(R$^1$R$^2$)— where R$^1$ and R$^2$, identical or different, represent a hydrogen atom Or art alkyl radical in C$_1$ to C$_4$.

n is equal to 0 or 1, q is equal to zero or is an integer varying from 1 to 15, where X, c and n may have definitions in each of the units —[(C$_c$F$_{2c}$)—(X)$_n$]—, $C_eH_{2e}$ represents a saturated, linear or branched hydrocarbon radical, where e represents an integer in the range from 1 to 12, p is equal to 0 or 1, Z represents a hydrogen or fluorine atom or a hydroxyl group, Y represents a —OH, —OR$^1$, —OM, —NH$_2$, —NHR$^1$, —N(R$^1$)$_2$, —N(R$^1$)$_3^+$, —COOH, —COOM, —COOR$^1$, —OCOR$^1$, —CN, —SO$_3$H, —SO$_3$M group, where R$^1$ is an alkyl radical in C$_1$ to C$_4$ and M is a metal ion, or Y and Z are linked to one another to form a polar pattern of the oxo, ether or ester type.

Advantageously, this solubilizing agent has a polar part, notably in that, given the definition of Y, it has at least one polar group as defined above.

It is, notably, because of the presence of such a pattern that the solubilizing agent shows an affinity for the, supporting salt or salts with which it is associated.

On the other hand, its fluorocarbon skeleton gives it an affinity for the associated fluorocarbon solvent.

In formula (I), q is preferably equal to 1.
In formula (I), n is preferably equal to 0.
In formula (I), p is preferably equal to 1.
In formula (I), c is preferably in the range from 4 to 8.
In formula (I), e is preferably in the range from 1 to 4.

Advantageously, the compound of formula (I) is saturated.

According to a variant, the compound of formula (I) is linear and saturated.

In particular, it is in C$_7$ to C$_{15}$.

Preferably, q is equal to 1, n is equal to 0 and p is equal to 1.

Preferably, c is in the range from 4 to 8 and e is in the range from 1 to 4.

Preferably, Y is chosen from among the groups —OH, —OR$^1$, —OM, —COOM, —COOR$^1$, —OCOR$^1$ where M and R$^1$ are as defined above.

More preferably, Y is a —OH group.
Preferably, Z is a fluorine atom.

According to a particular embodiment, the solubilizing agent conforms, to the formula (II):

F—(C$_c$F$_{2c}$)—(C$_e$H$_{2e}$)—Y      (II)

in which Y, c and e are as defined above.
Preferably, in formula (II), c is in the range from 4 to 8.
Preferably, in formula (II), e is in the range from 1 to 4.
Preferably, in formula (II), Y is a —OH group.

According to another particular embodiment, the solubilizing agent conforms to the formula (III):

F—(C$_c$F$_{2c}$)—Y      (III)

in which Y and c are as defined above.

Specific compounds representative of this variant are, notably, perfluoroalkanols and alkyl perfluoroesters.

For example, the solubilizing agent is perfluorooctanol.

As a general rule, the amount of solubilizing agent is adjusted, notably, in the presence of the fluorocarbon solvent and the supporting salt considered jointly, to provide access to a single phase electrolyte medium that ensures, the solubility of the salt and the production of the expected conductivity properties.

In particular, the fluorocarbon solvent and the solubilizing agent may be used in a volume or mass ratio of fluorocarbon solvent to solubilizing agent which is between 10/1 and 3/2, particularly between 6/1 and 2/1, notably between 5/1 and 3/1, and more particularly approximately 4/1.

The production of a single phase electrolyte medium according to the invention may be viewed with the naked eye, but may also be checked for measuring the conductivity of the liquid mixture formed, which must reach an optimal value. An appropriate measurement protocol using impedance spectroscopy for determining this value is illustrated in the examples given below.

Evidently, the choice of solubilizing agent is advantageously made by considering its physicochemical compatibility with the fluorocarbon solvent and the supporting salt to be dissolved therein. This selection is clearly within the competence of those skilled in the art.

Compatible compounds include, notably, fluorocarbon solvents and solubilizing agents that have, respectively, a saturated acyclic or cyclic carbon skeleton, and whose respective carbon numbers differ by less than 5 carbon atoms and, preferably by less than 3 carbon atoms.

Thus it may be advantageous to consider a solubilizing agent of the acyclic perfluoroalkanol type if the solvent is a perfluoroalkane in C$_6$ to C$_{12}$, such as perfluorodecalin fix example.

It may be advantageous to combine them in a volume or mass ratio of fluorocarbon solvent to solubilizing agent which varies from 50/5 to 30/20, particularly from 6/1 to 2/1, and notably from 5/1 to 3/1, and is preferably equal to approximately 4/1.

Among the fluorocarbon solvent/solubilizing agent pairs suitable for the invention we may particularly mention the perfluorodecalin/perfluorooctanol pair.

As specified above, the electrolyte according to the invention comprises a solubilizing agent or agents as 10% to 60%, or preferably 5% to 25%; of its total volume.

Carbonate Solvent

An electrolyte solvent medium according to the invention also contains at least one carbonate solvent.

This family of solvents is conventionally used in electrolyte media. These solvents, also called dissociating solvents, may be used to increase the ionic conductivity of the electrolyte medium containing them, because of their high dielectric capacity.

As non-limiting representatives of these carbonate solvents, we may, notably, mention ethylene carbonate, propylene carbonate, diethyl carbonate, ethyl methyl carbonate, dimethyl carbonate and mixtures thereof.

Evidently, the amount of this type of solvent is adjusted to avoid damage to the single phase system of the electrolyte medium required according to the invention.

Advantageously, the carbonate solvent or mixture of carbonate solvents forms 10% to 20%, or preferably 10% to 15%, by volume of the total volume of the electrolyte medium according to the invention.

In particular, the fluorocarbon solvent, the solubilizing agent and the carbonate solvent may be used with 50% to 70% by volume of fluorocarbon solvent, for 30% to 40% by volume of sol thilizing agent and 3% to 10% by volume of carbonate solvent, in volume proportionality.

SUPPORTING SALT

The supporting salt contained in the electrolyte medium according to the invention is a salt of alkali or alkaline earth metal, preferably lithium.

It advantageously consists of a salt including at least the Li$^+$ cation. The salt is, for example, chosen from among LiClO$_4$, LiAsF$_6$, LiPF$_6$, LiBF$_4$, LiR$_F$SO$_3$, LiCH$_3$SO$_3$, LiN(R$_F$SO$_2$)$_2$, and LiC(R$_F$SO$_2$)$_3$, R$_F$ being chosen from a fluorine atom and a perfluoroalkyl group comprising between 1 and 8 carbon atoms.

The amount of supporting salt in the electrolyte according to the invention is adjusted to optimize the ionic conductivity of the electrolyte. For evident reasons, this amount may therefore vary according to the chemical nature of the supporting salt concerned.

However, this amount usually varies from 0.1 to 5 mol/L, notably for lithium salts.

Among the electrolyte media which are particularly advantageous for the invention, we may notably mention those comprising at least:
perfluorodecalin as a fluorocarbon solvent,
perfluorooctanol as a solubilizing agent, notably in a ratio by volume of fluorocarbon solvent to solubilizing agent of 55/45,
LiTFSI as a supporting salt, notably at a molar concentration of 1 mol/L, and
propylene, carbonate as a carbonate solvent, notably at a concentration by volume of 9%.

According to a particular variant, the electrolyte, medium according to the invention may be used in gelled form.

For this purpose, it is formulated in a polymer matrix.

This matrix may be formed from at least one compound chosen from among polyethers, polyacrylamide, polycarbonate, polyethersulfone and copolymers thereof.

In addition to the electrolyte medium defined above, a metal-oxygen battery (or accumulator) according to the invention is formed by at least one electrochemical cell consisting of a separator impregnated with the electrolyte medium according to the invention, between a positive electrode or cathode and a negative electrode or anode, a current collector connected to the cathode, and a current collector connected to the anode.

Thus the battery according to the invention comprises a metal negative electrode and a positive electrode that is an oxygen reducer.

Preferably:
the material of the negative electrode(s) is lithium, aluminium or zinc, and
the material of the positive electrode is carbon, platinum or $MnO_2$.

The anode and cathode may be deposited by a commonly used technique in the form of an active layer on a metal sheet or strip forming a current collector.

The current collector connected to the positive electrode is usually made of aluminum.

The current collector connected to the negative electrode is usually made of copper, nickel-plated copper, or aluminum.

According to a preferred variant, the battery according to the invention is a lithium-oxygen ($Li/O_2$) battery.

FIGURES

FIG. 1: Cyclic voltammetry curves in a 09PFDOol solution (working electrode: 3 mm vitreous carbon, counter electrode: platinum wire, reference electrode $Ag^0/Ag^+$, 0.01 M $AgNO_3$/0.1 M $TBAPF_6$/$CH_3CN$ freshly prepared, E vs. $Li^+/Li^0$=3.53 V vs. $Ag^0/Ag^+$, 100 $mV.s^{-1}$).

EQUIPMENT AND METHODS

The conductivity measurements were made by means of a MMultyConductimeter thermostatically controlled 12 cell condurimeter produced by MaterialsMates. The measurement cell was filled with 1 mL electrolyte, and was then connected and placed in a thermostatically controlled sand bath at 22° C. The measurements were made for 2 hours.

The measurements of electrochemistry in solution were made in an electrochemical cell with 3 electrodes (working electrode: 3 mm vitreous carbon, counter electrode: platinum wire, reference electrode $Ag^0/Ag^+$, 0.01 M $AgNO_3$/0.1 M $TBAPF_6$/$CH_3CN$ freshly prepared, E vs $Li^+/Li^0$=3.53 V vs $Ag^0/Ag^+$, TBA=tetrabutyl ammonium).

An electrode containing 80% by weight of SuperP electron conductive carbon and 20% by weight of PVDF (polyvinylidene fluoride) binder was formed according to the following protocol.

400 mg of SuperP was mixed with 950 mg of a 12% solution by weight of PVDF in NMP (N-methylpyrrolidone), and 6.15 g of additional NMP was then added. The resulting mixture was dispersed in a Dispermat at 2000 rpm for 20 minutes, then at 5000 rpm for 5 minutes. The resulting ink was applied (1=200 μm) to aluminum foil on a coating bench, then dried in a kiln at 55° C. The resulting electrode was cut into a 14 mm diameter disk and pressed at 10 tonnes, before being vacuum dried for 48 hours at 80° C.

A battery using the previously formed electrode was assembled in a glove box with a counter electrode of lithium metal according to the following protocol.

The resulting electrode was stacked facing a 16 mm diameter lithium metal electrode, both separated by a polyamide-based membrane (Dupont). The assembly was then soaked in the electrolyte being studied, and was crimped into a stainless steel button battery.

The supporting salt was LiTFSI, marketed by Sigma Aldrich.

Different tests of solubility of LiTFSI were conducted in a number of mixtures according to the invention and were characterized by measurements of ionic conductivity and/or electrochemistry in solution or electrochemistry in a button battery.

EXAMPLE 1 (CONTROL)

2.13 g of LiTFSI was dissolved in 25 mL perfluorodecalin:perfluorooctanol (4:1), this mixture corresponding to a dissolved salt concentration of 0.3 M (reference electrolyte: 03PFDOol).

EXAMPLE 2

2.13 g of LiTFSI was dissolved in 25 mL of perfluorodecalin:perfluorooctanol:dimethyl carbonate (4:1:0.1), this single phase mixture corresponding to a dissolved salt concentration of 0.3 M (reference electrolyte: 06PFDOol).

EXAMPLE 3

4.25 g of LiTFSI was dissolved in 25 mL of perfluorodecalin:perfluorooctanol:ethylene carbonate (3.5:1.35:0.15), this single phase mixture corresponding to a dissolved salt concentration of 0.6 M (reference electrolyte: 07PFDOol).

EXAMPLE 4

4.96 g of LiTFSI was dissolved in 25 mL of perfluorodecalin:perfluorooctanol:ethylene carbonate:propylene carbonate (3.11:1.62:0.13:0.14), this mixture corresponding to a dissolved salt concentration of 0.7 M (reference electrolyte: 08PFDOol).

EXAMPLE 5

7.15 g of LaTSI was dissolved in 25 mL of perfluorodecalin:perfluorooctanol:propylene carbonate (2.55:2:0.45), this mixture corresponding to a dissolved salt concentration of M (reference electrolyte: 09PFDOol).

The ionic conductivities of all the electrolyte media of the preceding examples were measured at ambient temperature according to the protocol described above, and the results are shown in Table 1 below.

TABLE 1

| Example | Reference | Ionic conductivity (mS · cm$^{-1}$) |
|---|---|---|
| 1 (control) | 03 PFDOol | 3.3 * 10$^{-3}$ |
| 2 | 06 PFDOol | 1.9 * 10$^{-2}$ |
| 3 | 07 PFDOol | 2.7 * 10$^{-2}$ |
| 4 | 08 PFDOol | 7.1 * 10$^{-2}$ |
| 5 | 09 PFDOol | 11.3 * 10$^{-2}$ |

A significant increase in ionic conductivity is seen as the solubility of the carrying salts increases due to the addition of compatibilizing solvent. The addition of carbonate in the proportion of 3% between the 03PFDOol solution and the 06PFDOol solution also provides a gain of an order of magnitude in the ionic conductivity.

EXAMPLE 6

The cyclic voltammetry curve was plotted for the electrolyte described by way of example in the conditions described above.

Thus, FIG. 1 shows the cyclic voltammetry curve of the electrolyte of Example 5. The cyclic voltammetry curve shows an absence of reduction and oxidation peaks with currents of the order of one μA, demonstrating an excellent stability of the electrolyte over a voltage range from 0 to 5 V.

The invention claimed is:

1. A metal-oxygen battery, comprising, a single phase electrolyte medium comprising at least:
   a supporting salt of alkali or alkaline earth metal,
   a fluorocarbon solvent having a solubility for oxygen of at least 30% v/v,
   from 10% to 60% by volume of at least one fluorinated solubilizing agent, which is distinct from said fluorocarbon solvent, is selected from the group consisting of mono-, poly- and perfluorinated, saturated, unsaturated and/or aromatic, linear, branched and/or cyclic hydrocarbon compounds, and has 4 to 18 carbon atoms with a carbon chain carrying at least one polar terminal pattern and is optionally interrupted by one or more heteroatoms selected from the group consisting of oxygen and sulfur, and one or more radicals selected from the group consisting of —N(R$^1$)—, —B(R$^1$)—, and —P(R$^1$R$^2$)—, where R$^1$ and R$^2$, identical or different, represent a hydrogen atom or a C$_1$-C$_4$ alkyl radical, and
   a carbonate solvent.

2. The battery of claim 1, wherein the fluorocarbon solvent is selected from the group consisting of a perfluorocarbonate, a saturated, unsaturated and/or aromatic, linear, branched and/or cyclic compound, and a compound containing 4 to 18 carbon atoms.

3. The battery of claim 1, wherein the fluorocarbon solvent is selected from the group consisting of decafluoropentane, tridecafluorohexane, pentafluorobutane, nonafluorohexane, heptafluorocyclopentane, tetradecafluorohexane, hexadecafluoroheptane, perfluorooctane, 1H-perfluorooctane, perfluorononane, perfluorodecalin and perfluorooctanol.

4. The battery of claim 1, wherein the solubilizing agent has formula (I):

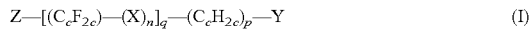

in which:
   each C$_c$F$_{2c}$ independently represents a saturated, linear or branched perfluorocarbonate radical, where c represents an integer of 4 to 18,
   each X is independently oxygen, sulfur, —N(R$^2$)—, —B(R$^2$)— or —P(R$^3$R$^2$)— where R$^3$ and R$^2$, identical or different, represent a hydrogen atom or a C$_1$-C$_4$ alkyl radical,
   each n is independently 0 or 1,
   q is zero or an integer varying from 1 to 15,
   C$_e$H$_{2e}$ represents a saturated, linear or branched hydrocarbon radical, where e represents an integer of 1 to 12,
   p is equal to 0 or 1,
   Z represents a hydrogen or fluorine atom or a hydroxyl group,
   Y represents a —OH, —OR$^1$, —OM, —NH$_2$, —NHR$^1$, —N(R$^1$)$_2$, —N(R$^1$)$^{3+}$, —COOH, —COOM, —COOR$^1$, —OCOR$^1$, —CN, —SO$_3$H, or —SO$_3$M group, where R$^1$ is a C$_1$-C$_4$ alkyl radical and M is a metal ion, or
   Y and Z are linked to one another to form a polar pattern of the oxo, ether or ester type.

5. The battery of claim 1, wherein the solubilizing agent is selected from the group consisting of a perfluoroalkanol and an alkyl perfluoroester.

6. The battery of claim 1, wherein the fluorocarbon solvent and the solubilizing agent are present in a ratio by volume of from 50/5 to 30/2.

7. The battery of claim 1, comprising at least perfluorodecalin as the fluorocarbon solvent and at least perfluorooctanol as the solubilizing agent.

8. The battery of claim 1, comprising a compound selected from the group consisting of ethylene carbonate, propylene carbonate, diethyl carbonate, dimethyl carbonate, ethyl methyl carbonate, and a mixture thereof as the carbonate solvent.

9. The battery of claim 1, comprising 50% to 70% by volume of the fluorocarbon solvent, 30% to 40% by volume of the solubilizing agent, and 3% to 10% by volume of the carbonate solvent.

10. The battery of claim 1, comprising, as the supporting salt of alkali or alkaline earth metal, at least one compound selected from the group consisting of LiClO$_4$, LiAsF$_6$, LiPF$_6$, LiBF$_4$, LiR$_F$SO$_3$, LiCH$_3$SO$_3$, LiN(R$_F$SO$_2$)$_2$, and LiC(R$_F$SO$_2$)$_3$, where R$_F$ is selected from the group consisting of a fluorine atom and a perfluoroalkyl group comprising 1 to 8 carbon atoms.

11. The battery of claim 1, which is a lithium-oxygen battery.

12. The battery of claim 1, further comprising:
   a metal negative electrode and a positive electrode that is an oxygen reducer.

13. The battery of claim 1, wherein the supporting salt of alkali or alkaline earth metal is a lithium salt.

14. The battery of claim 1, wherein the fluorocarbon solvent is perfluorodecalin.

15. The battery of claim 1, wherein the solubilizing agent is perfluorooctanol.

16. The battery of claim 1, wherein the fluorocarbon solvent and the solubilizing agent are present in a volume ratio of from 5/1 to 3/1.

* * * * *